(12) United States Patent
Bryant et al.

(10) Patent No.: US 11,402,036 B2
(45) Date of Patent: Aug. 2, 2022

(54) AIRCRAFT CABLE ROUTING SYSTEM AND METHOD OF INSTALLATION THEREOF

(71) Applicant: Airbus Operations Limited, Bristol (GB)

(72) Inventors: Anthony Bryant, Bristol (GB); Paul O'Shaughnessy, Bristol (GB); Christopher Bills, Bristol (GB)

(73) Assignee: AIRBUS OPERATIONS LIMITED, Bristol (GB)

( * ) Notice: Subject to any disclaimer, the term of this patent is extended or adjusted under 35 U.S.C. 154(b) by 0 days.

(21) Appl. No.: 16/451,796

(22) Filed: Jun. 25, 2019

(65) Prior Publication Data

US 2020/0003337 A1    Jan. 2, 2020

(30) Foreign Application Priority Data

Jun. 29, 2018   (GB) .................................... 1810741

(51) Int. Cl.
*F16L 3/01*        (2006.01)
*F16L 3/02*        (2006.01)
(Continued)

(52) U.S. Cl.
CPC .......... *F16L 3/01* (2013.01); *F16L 3/02* (2013.01); *F16L 3/26* (2013.01); *H02G 3/30* (2013.01)

(58) Field of Classification Search
CPC ....... F16L 3/01; F16L 3/02; F16L 3/26; F16L 3/30; F16L 3/22; F16L 3/221;
(Continued)

(56) References Cited

U.S. PATENT DOCUMENTS 1,590,569 A     6/1926   Fisk
3,894,706 A *   7/1975   Mizusawa ............... F16L 3/237
                                                                248/68.1
(Continued)

FOREIGN PATENT DOCUMENTS

CN       203589630      5/2014
WO     2004/003617    1/2004
WO     2009/026369    2/2009

OTHER PUBLICATIONS

Combined Search and Examination Report for GB1810741.7, dated Dec. 14, 2018, 8 pages.

*Primary Examiner* — Christopher Garft
(74) *Attorney, Agent, or Firm* — Nixon & Vanderhye P.C.

(57) ABSTRACT

A cable routing system is disclosed including a routing fixture and an exit fitting. The routing fixture defines a channel for a cable. The channel is engaged by the exit fitting and a cable in the channels exits through an exit channel defined by the exit fitting. The exit channel is directed away from the channel in the routing fixture. The resulting assembly allows low profile cable runs that can conform to a structural surface and in which cables can be broken out easily, without a requirement to cut the cable. A clamp may be provided to further secure the exit fitting to the routing fixture. A method of installation involves installing a cable into a routing channel before installing the exit fitting. The cable routing system can be used in an aircraft, including space constrained areas such as within an aircraft wing.

13 Claims, 8 Drawing Sheets

(51) Int. Cl.
*F16L 3/26* (2006.01)
*H02G 3/30* (2006.01)

(58) Field of Classification Search
CPC ......... F16L 3/222; F16L 3/223; F16L 3/2235;
F16L 3/227; F16L 3/237; F16L 5/00;
F16L 3/10; F16L 3/1091; F16L 3/1025;
H02G 3/32; H02G 3/34; H02G 3/36;
H02G 3/0437; H02G 3/045
See application file for complete search history.

(56) References Cited

U.S. PATENT DOCUMENTS

| | | | | |
|---|---|---|---|---|
| 4,775,121 A * | 10/1988 | Carty | .................... | F16L 3/2235 248/68.1 |
| 5,016,842 A * | 5/1991 | Suzuki | ................ | B60R 16/0215 248/68.1 |
| 5,271,585 A | 12/1993 | Zetena, Jr. | | |
| 5,613,655 A * | 3/1997 | Marion | ................. | F16L 3/2235 24/339 |
| 5,615,850 A * | 4/1997 | Cloninger | ................. | F16L 3/22 248/68.1 |
| 5,792,993 A | 8/1998 | Rinderer | | |
| 6,126,123 A * | 10/2000 | Yang | ................... | B60R 16/0215 248/74.1 |
| 6,354,545 B1 * | 3/2002 | Liao | ........................ | B60T 7/104 224/459 |
| 6,717,055 B2 | 4/2004 | Kato | .................. | B60R 16/0215 173/136 |
| 7,114,687 B2 * | 10/2006 | Swantner | .................. | F16L 3/10 248/74.2 |
| 7,228,048 B1 * | 6/2007 | Dunfee | .................... | H02G 3/32 385/136 |
| 7,740,211 B2 * | 6/2010 | Dukes | ...................... | H02G 1/08 248/74.4 |
| 7,781,684 B2 * | 8/2010 | Stuckmann | ............ | H02G 3/088 174/650 |
| 8,505,858 B2 * | 8/2013 | Hansen | ................. | F16L 3/1226 248/74.3 |
| 10,840,684 B2 * | 11/2020 | Yamauchi | ........... | B60R 16/0215 |
| 2003/0183413 A1 * | 10/2003 | Kato | ........................ | H02G 3/32 174/135 |
| 2004/0104315 A1 * | 6/2004 | Betz | ........................ | H02G 3/26 248/74.2 |
| 2004/0129445 A1 * | 7/2004 | Winkelbach | ......... | H02G 3/0437 174/76 |
| 2004/0251386 A1 * | 12/2004 | Mizukoshi | ........... | F16L 55/035 248/68.1 |
| 2005/0120652 A1 * | 6/2005 | Cacciani | ................ | F16L 3/223 52/302.1 |
| 2007/0200034 A1 * | 8/2007 | Urzua | ...................... | H02G 3/30 248/68.1 |
| 2010/0006709 A1 * | 1/2010 | Bleus | ....................... | H02G 3/32 248/68.1 |
| 2010/0147584 A1 * | 6/2010 | Suzuki | ................. | H02G 3/0437 174/72 C |
| 2012/0103685 A1 * | 5/2012 | Blanchard | ............ | H02G 3/0431 174/72 A |
| 2014/0090867 A1 * | 4/2014 | Kelly | ....................... | H02G 3/32 174/97 |
| 2015/0036992 A1 * | 2/2015 | Fleming | ................ | H02G 3/045 385/135 |
| 2015/0101837 A1 * | 4/2015 | Evangelista | ......... | H02G 15/113 29/525 |
| 2016/0153588 A1 * | 6/2016 | Valola | .................... | B29C 53/08 248/544 |
| 2016/0281905 A1 * | 9/2016 | Fox | ........................ | F16L 59/135 |
| 2016/0345458 A1 * | 11/2016 | Hopperton | ................ | F16L 5/00 |
| 2017/0279255 A1 * | 9/2017 | Gordon | ................ | H02G 3/0487 |
| 2017/0292634 A1 * | 10/2017 | Nguyen | .................... | F16L 3/22 |
| 2020/0102088 A1 * | 4/2020 | Berceli | ..................... | F16L 3/26 |

\* cited by examiner

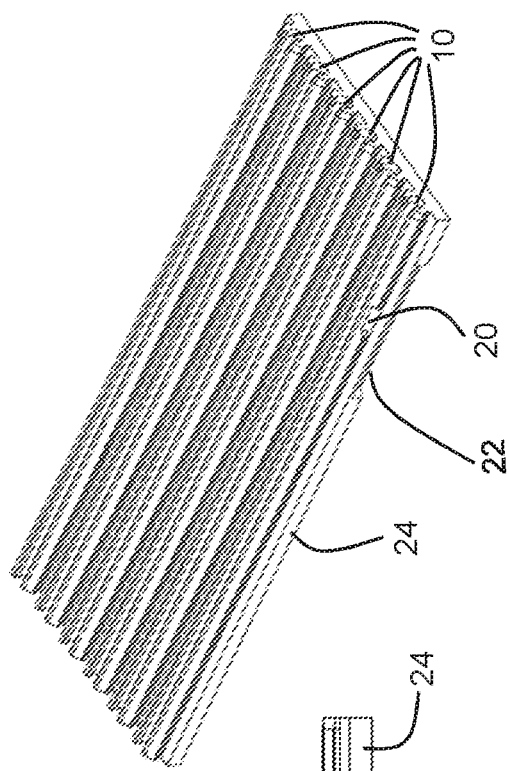
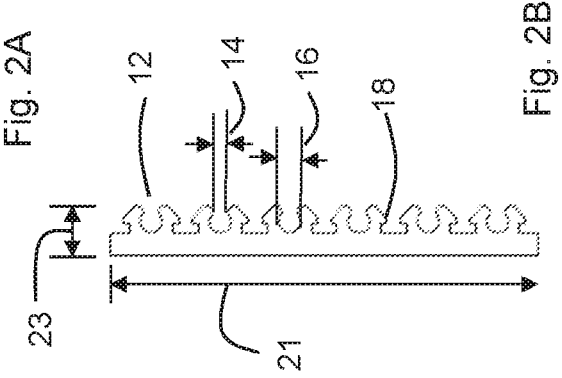
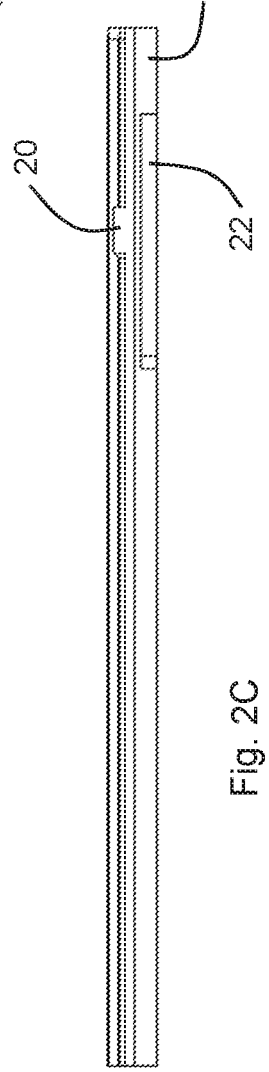
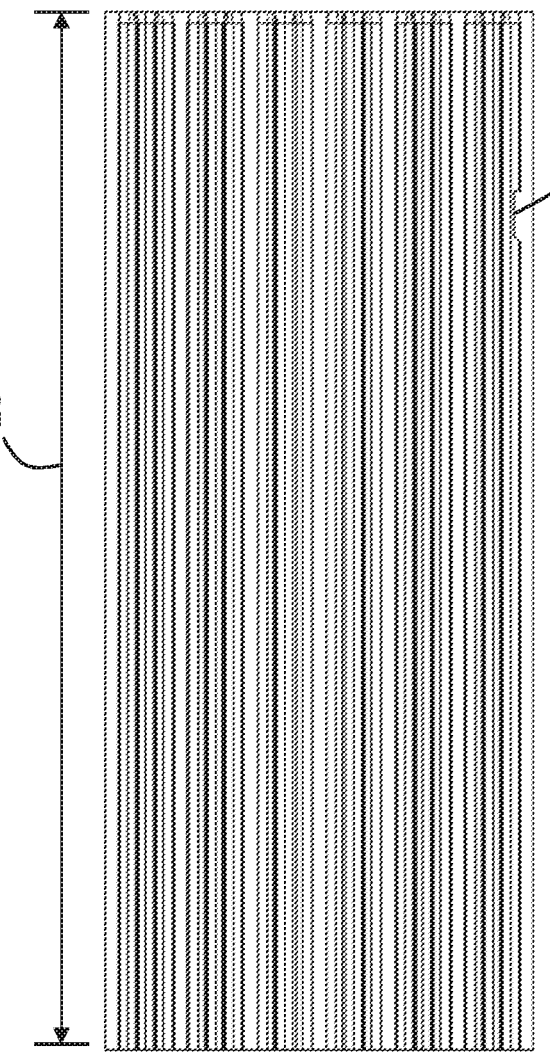

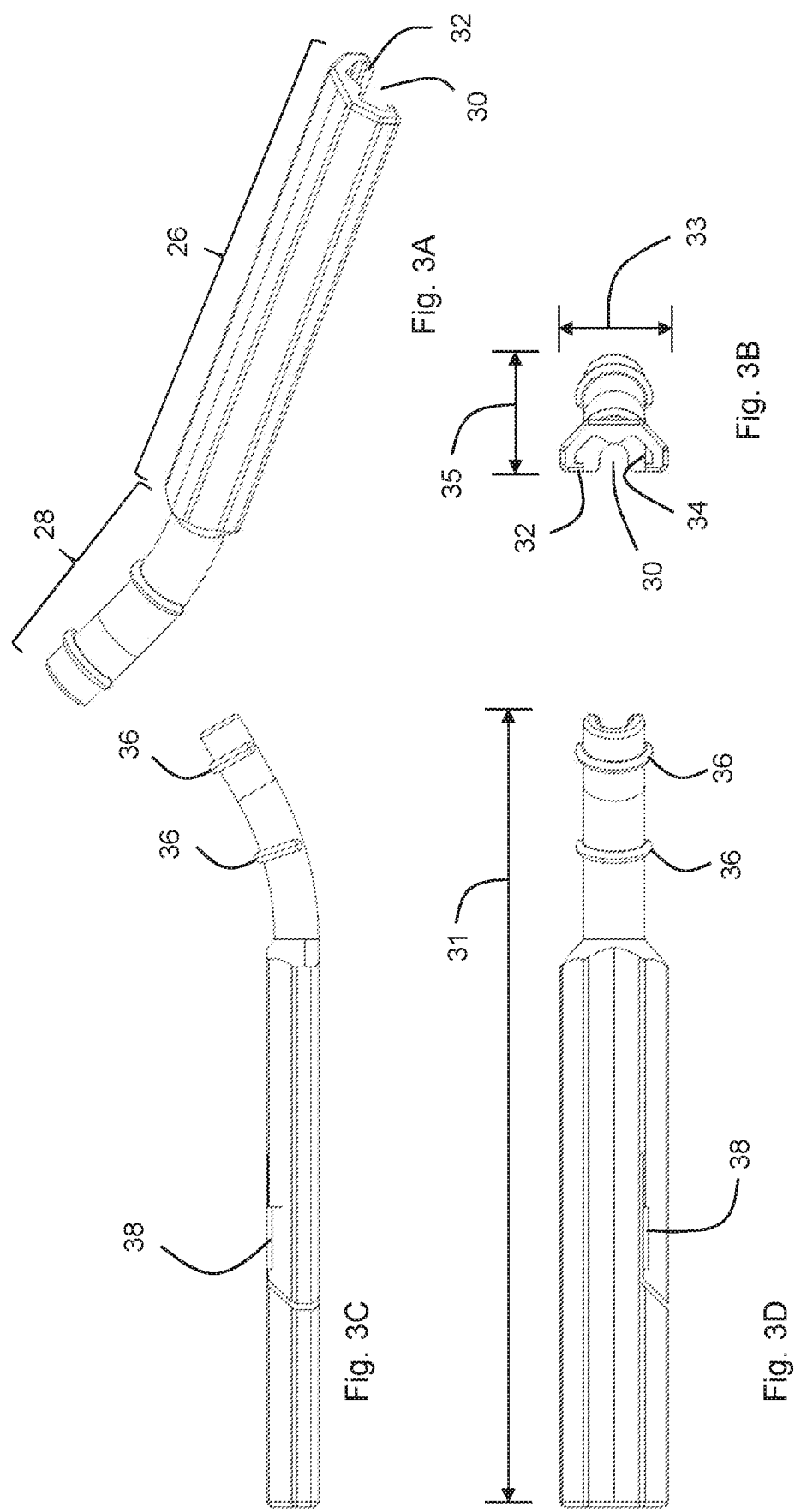

AIRCRAFT CABLE ROUTING SYSTEM AND METHOD OF INSTALLATION THEREOF

CROSS RELATED APPLICATION

This application claims priority to United Kingdom (GB) Patent Application 1810741.7, filed Jun. 29, 2018, the entire contents of which are hereby incorporated by reference.

TECHNICAL FIELD

The present invention relates to a cable routing system for an aircraft and a method for installing a cable routing system in an aircraft.

BACKGROUND

An aircraft contains cables for many different purposes including transmitting and receiving data, such as sensor data, electrical power and control signals. As the design of aircraft increases in complexity, so does the complexity of the cabling required. Often several separate cables will follow the same route through the aircraft. Installing such cables is complex, as is any required maintenance after installation.

Channels can be routed raceways which contain multiple cables, but these may be a relatively inefficient use of space and it can be difficult to identify and maintain specific cables after installation.

Optical cables can present further routing challenges when it is desired to break cables out of the route. This can require physically cutting the optical fibre and breaking it out from the cable route through a connection to another cable in a breakout box.

SUMMARY

According to a first aspect of the present invention, there is provided an aircraft cable routing system comprising a routing fixture and an exit fitting. The routing fixture comprises a routing channel for a cable, wherein the routing channel defines an opening along its length, and wherein a width dimension of the opening is smaller than an internal width dimension of the routing channel. The exit fitting defines an exit channel, wherein the exit fitting is configured for engagement with the routing channel such that the exit channel is directed away from the routing channel.

Optionally, the exit fitting comprises: a first engagement feature for resisting movement of the exit fitting relative to channel in a first direction; and a second engagement feature for resisting movement of the exit fitting relative to the channel in a second direction which is different to the first direction.

Optionally, the routing fixture comprises a base for supporting the channel, and the exit channel is directed away from the base in use.

Optionally, the exit channel defines an opening along its length which is positioned facing the opening defined by the routing channel when the exit fitting is engaged with the routing channel.

Optionally, the aircraft cable routing system comprises a retaining element configured to retain a cable in the exit channel in use. The retaining element may be configured to anchor a cable in a longitudinal direction relative to the exit channel.

Optionally, the aircraft cable routing system comprises a clamp configured to engage the exit fitting and the routing fixture in use.

Optionally, the routing fixture may define at least two routing channels, wherein the at least two routing channels are arranged in a row and generally parallel to each other. The aircraft cable routing system may then comprise a second routing fixture which defines fewer channels than the routing fixture.

According to a second aspect of the present invention, there is provided an aircraft wing comprising: an aircraft cable routing system as described above, with or without any of the optional features also described; and a cable installed in the routing channel and the exit channel.

Optionally, the cable routing system is positioned inside a fuel tank. The cable may be an optical cable.

According to a third aspect of the present invention, there is provided an aircraft comprising: a cable routing system as described above, with or without any of the optional features also described; and a cable installed in the routing channel and the exit channel.

According to a fourth aspect of the present invention, there is provided a method of installing cables in an aircraft comprising: providing a routing fixture defining a routing channel on a structural element of the aircraft; installing a cable in the routing channel; engaging an exit fitting with the routing channel, the exit fitting defining an exit channel directed away from the routing channel; and retaining the cable in the exit channel.

Optionally, the engaging an exit fitting comprises sliding the exit fitting over an end of the routing channel.

Optionally, the method comprises engaging a clamp with the both the routing fixture and exit fitting.

Optionally, the routing fixture defines at least two routing channels, and the method further comprises: providing a second routing fixture on a structural element, wherein the second routing fixture is positioned adjacent the routing fixture and defines fewer routing channels than the routing fixture; installing a second cable in both a second routing channel of the routing fixture and a routing channel of the second routing fixture.

According to a fifth aspect of the present invention, there is provided a cable routing system for an aircraft comprising: a cable channel which is substantially a tubular segment, wherein the cable channel is open along its length and an opening to the cable channel is narrower than an internal diameter of the cable channel; and an exit fitting defining an exit channel, wherein the exit fitting is configured for engagement with the cable channel such that the exit channel is aligned with the cable channel at one end and directed away from a longitudinal axis of the cable channel.

BRIEF DESCRIPTION OF THE DRAWINGS

Embodiments of the invention will now be described, by way of example only, with reference to the accompanying drawings, in which:

FIGS. 2A, 2B, 2C and 2D depict schematic three-dimensional, end, side and plan views of a routing fixture used in the cable routing system of FIG. 1;

FIGS. 3A, 3B, 3C and 3D depict schematic three-dimensional, end, side and plan views of an exit element used in the cable routing system of FIG. 1;

DETAILED DESCRIPTION

An aircraft contains many cables for many purposes. Often, these cables are required to follow a route along with many other cables. Installing and maintaining cables where they are routed with other cables can be difficult, leading to increased production and maintenance times. Furthermore, it can be difficult to remove, or break out, a cable from its route without cutting or otherwise breaking the cable to allow it to exit. While systems such as raceways can assist with routing multiple routing cables along the same route, they may not represent a most efficient use of space and it can be difficult to later identify and remove or replace cables from the raceway for maintenance.

Figure 1:
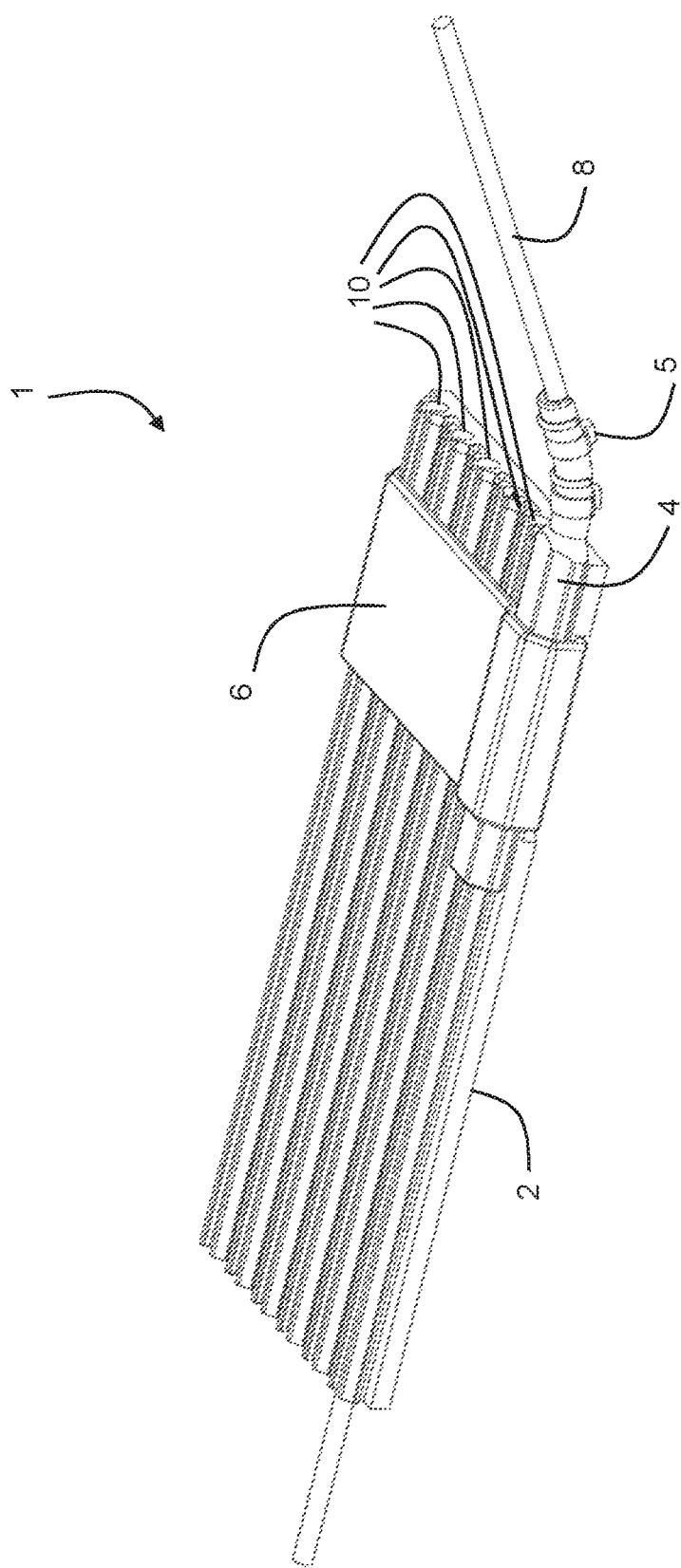
FIG. 1 is a schematic three-dimensional view of a cable routing system according to an embodiment.
Figure 4A:
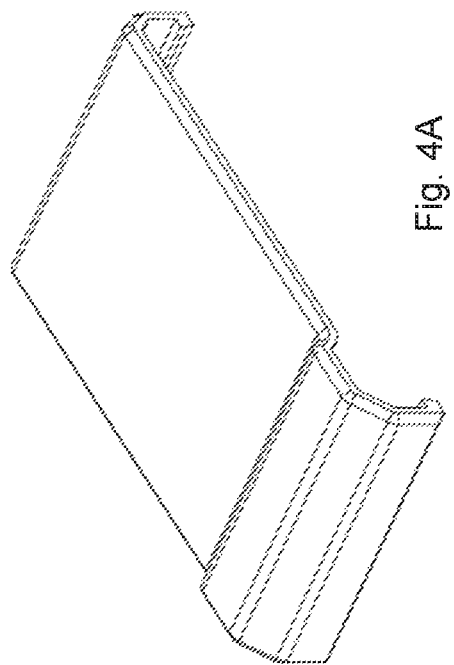
FIGS. 4A, 4B, 4C and 4D depict schematic three-dimensional, end, side and plan views of a clamp used in the cable routing system of FIG. 1.
Figure 4B:
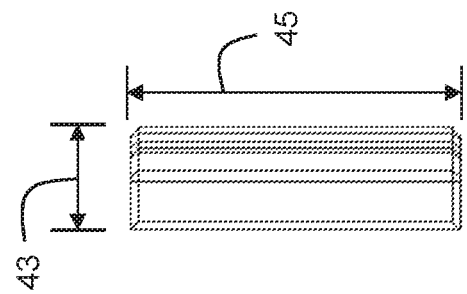
Figure 4C:
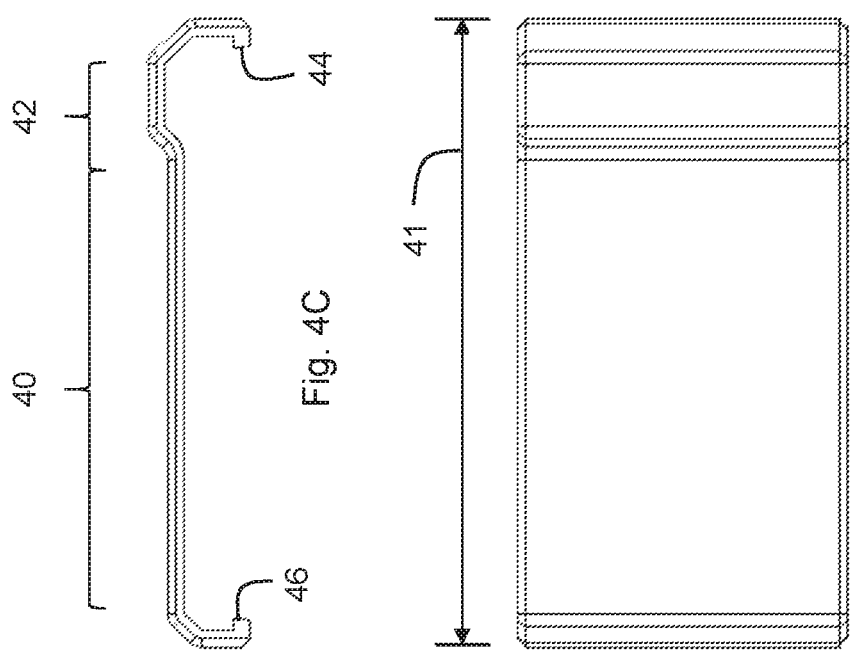
Figure 4D:
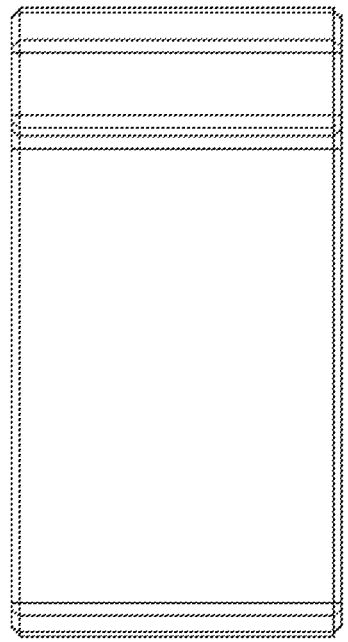

FIG. 1 depicts a three-dimensional view of a cable routing system 1 according to an embodiment which enables simple installation, maintenance and break out of cables. The cable routing system 1 of FIG. 1 includes a routing fixture 2, an exit fitting 4 and a clamp 6. For clarity, a single cable 8 is shown installed in a routing channel, or cable channel, leading to the exit fitting 4 with other routing channels 10 shown as empty. In other examples, some or all of the other routing channels 10 also have cables installed in them. As will be explained in more detail below, the cable routing system 1 has a low profile and may conform to the surface of structural elements to which it is affixed.

The routing fixture is shown in isolation in FIGS. 2A, 2B, 2C and 2D, which depict three-dimensional, end, side and plan views, respectively. There are six routing channels 10 for receiving cables, but other examples may have fewer or more than six routing channels. The routing channels 10 are open along their length, with dimensions chosen to allow installation of a cable into the routing channel 10 through the opening. In this example, the cross section of the routing fixture is about 37 mm wide (shown as element 21 in FIG. 2B) and about 4.4 mm high (shown as element 23 in FIG. 2B), the length (shown as element 25 in FIG. 2D) can vary depending on the application and the length of the component the routing fixture is attached to, for example about 800 to about 2000 mm. Other examples may have other dimensions as required. The routing channels are supported by a base 24 and arranged in a row generally parallel to each other. As can be seen in FIGS. 2A and 2D, the routing channels 10 are spaced equally along a width of the base 24, in other examples the channels need not be spaced equally. The base 24 is substantially flat or planar in this example, which is well suited for attachment to a structural element with a flat surface. In other examples, the base is not flat, for example it may be curved or otherwise shaped in three dimensions for attachment to a structural element which does not have a flat surface.

As can be seen most clearly in FIG. 2B, the routing channels 10 are generally tubular in cross section, so that the length of the routing channel 10 is a longitudinal axis of the tube. As shown in FIG. 2B, the routing channels define an outer profile which is a horizontal tubular segment, that is the routing channel is formed from a tube which has been cut by a plane oriented parallel to the axis of the tube (analogous to the way a horizontal cylindrical segment is a solid cut from a cylinder by a plane oriented parallel to the cylinder's axis of symmetry). Other examples may have different cross sections, including elliptical, square, rectangular, polygonal and irregular.

The opening 12 to the routing channel 10 has a width dimension 14 which is smaller than an internal width dimension of the routing channel 10. For the routing fixture of FIG. 2, where the routing channels are generally tubular, the greatest internal width 16 of the routing channel 10 is its internal diameter. The opening 12 to the routing channel 10 is therefore narrower than the internal diameter of the routing channel 10, and the internal walls of the routing channel circumscribe an arc of greater than 180°, greater than 200°, greater than 220°, or greater than 240°. Other examples may achieve the narrowing of the opening in other ways, for example by including an inwardly facing protrusion adjacent the opening along all or part of the length of the routing channel. In use, a cable of smaller diameter than the routing channel 10, but larger than the width 14 of the opening 12 is inserted into the routing channel. Resilience in either or both of the cable and channel walls allow a cable to be press-fitted into the routing channel.

Features are provided on the routing fixture 2 to engage with the exit fitting 4, so that the exit fitting 4 is retained in place on the routing fixture 2 securely. A first engagement feature on the routing fixture 2 is provided along the length of the routing channels 10. The walls of the routing channel 10 define lengthwise, or axial, projections or flanges 18, seen most clearly in FIG. 2B. Although in this example the flanges 18 are generally formed along the whole length of the channel, in other examples they may be provided partially along the length of the routing channel, for example at an end portion of the channel or discontinuously along the length of the routing channel. In use, the flanges 18 engage a corresponding feature of the exit fitting (described in more detail with reference to FIG. 3B below) to retain the exit fitting in place in a first direction, which is generally opposite to the direction by which cables are inserted into the opening 12.

A second engagement feature for the exit fitting is provided by recess 20, which is formed along the length of an outermost one of the routing channels 10 and axially offset from the end of the routing channel. In use, the recess 20 is engaged by a corresponding protrusion on the exit fitting, and operates to retain the exit fitting at a particular axial, longitudinal or lengthwise position on the routing channel. As shown in FIGS. 2A, 2C and 2D, the recess 20 in this example has a defined start and end point, however in other examples the recess could extend from a longitudinally offset position from one end of the routing channel all the way to the other end of the routing channel. Such a construction would provide a step portion which can be engaged by a corresponding feature on the exit fitting to prevent movement in one direction along the length of the channel. In another example a protrusion or raised portion may be provided as an engagement feature on the routing fixture, to limit longitudinal movement of the exit fitting.

The routing fixture also includes an engagement feature for receiving the clamp. A recess 22 is formed in a base 24 of the routing fixture, for engagement by a corresponding engagement feature, such as a protrusion, on the clamp. A corresponding recess (not visible) is also formed on the opposite side of the base 24, generally aligned with the recess 24 in a longitudinal direction.

The exit fitting 4 is depicted in isolation FIGS. 3A, 3B, 3C and 3D, which depict three-dimensional, end, side and plan views respectively. The exit fitting comprises a body portion 26, including engagement features to connect with the routing fixture and hold the exit fitting 4 in place over a routing channel 10, and an exit channel 28. In this example, the exit fitting is about 52 mm long (shown as element 31 in FIG. 3D), about 7 mm wide (showing as element 33 in FIG. 3B) and about 6 mm high (shown as element 35 in FIG. 3B) including the curve of the exit channel. Other examples may have other dimensions.

The exit channel 28 is curved away from an axis of the body portion 26. In use, this enables the exit channel 28 to be directed away from the routing channel 10 and/or the base 24. The radius of curvature of the exit channel can be chosen to limit the bend radius of a cable on exit, helping to prevent cable damage or loss of performance.

The exit fitting defines an opening 30 along its length, allowing it to be placed over a cable in use. The opening 30 is positioned facing the opening 12 defined by the routing channel 10 in use, when the exit fitting 4 is engaged with a routing channel 10. Put another way, in use, the opening 30 of the exit fitting 4 is accessed in the opposite direction than the opening 12 of the routing channel 10. In this way, when the exit fitting 4 is engaged with the routing fixture 2, a routing channel 10 is completely enclosed along part of its length by the combination of the routing channel 10 and the exit fitting 4. In other examples, the routing channel may not be completely enclosed, but may be enclosed sufficiently that removal of the cable from the routing channel is prevented.

In order to retain the exit fitting 4 on the routing fixture 2 in use, the exit fitting 4 comprises two engagement features. A first engagement feature resists movement of the exit fitting relative to the routing channel in a first direction, which is perpendicular to the longitudinal or axial direction of the routing channel. A second engagement feature resists movement of the exit fitting relative to the routing channel in a longitudinal or axial direction. A lip or protrusion 32 provides the first engagement feature, engaging flange 18 on the routing channel when assembled. A protrusion 34 formed inside the body portion 26 provides the second engagement feature, engaging the recess 20 forming in the wall of the routing channel when assembled.

Similar to the routing channel 10, the exit channel 28 is open along its length, allowing installation of the exit fitting 4 over a cable which is already present in the routing channel 10. The exit channel has walls which circumscribe an arc of more than 180° about the longitudinal axis, for example at least 190° or at least 2000, so that a cable can be press fit into the exit channel 28 in the same way as it can for the routing channel 10 described above. The exit channel may define a same width of opening as the routing channel or a different width, for example it may be slightly wider to assist bending the cable into the exit channel 28.

The action of bending a cable into the exit channel means that the exit channel is likely to experience a greater force or moment from the cable due to the bending. In order to retain a cable securely in the exit channel, a retaining element can be provided. Ridges 36 are provided on the exit channel to engage such a retaining element, although alternative forms can be provided, such as a recess or groove in other examples. Other examples may have a smooth surface, where the frictional force between the retaining element, the exit channel and the cable is sufficient to keep it in position.

Suitable retaining elements 5 (not shown in FIG. 3A, 3B, 3C or 3D) for retaining a cable in the exit channel include a cable tie, spring clip or a worm drive cable clamp, such as a Jubilee® clip. Such retaining elements encircle the exit channel and the cable within it to retain the cable within the exit channel. The force applied by such elements may be sufficient to also retain the longitudinal position of the cable in the exit channel, anchoring the cable in the exit channel so that the cable does not move in the longitudinal direction relative to the exit channel. This can be advantageous to ensure the that the cable is accurately positioned, while allowing movement of the cable relative to the routing fixture in a longitudinal direction, as may occur as structural elements flex or due to differing rates of thermal expansion between the cable and the routing fixture. The portion of the cable which extends beyond the routing system, past the end of the exit channel, may be protected in a conduit or sheath. The retaining elements can also engage the conduit or sheath and retain that in place on the exit fitting. In another example, a separate retaining element is provided to retain the conduit or sheath in place on the exit channel.

A recess 38 is also formed in the body portion 26 for engaging the clamp 6. The clamp 6 is depicted in FIGS. 4A, 4B, 4C and 4D, which show three-dimensional, end, side and plan views, respectively. Clamp 6 provides a further means of retaining the exit fitting in place on the routing fixture, increasing the security of the connection and providing an element of redundancy to protection against a failure of the retaining elements between the routing fixture and the exit fitting. In addition, the clamp 6 also acts to further retain cables in routing channels without an exit fitting.

As shown in FIGS. 4A, 4B, 4C and 4D, the clamp 6 is configured for use in combination with a routing fixture 4 having six routing channels 10 and an outermost one of the routing channels having an exit fitting, as depicted in FIG. 1. The clamp comprises a first body portion 40 for covering routing channels without an exit fitting and a second body portion 42 for covering the exit fitting. Depending on the number of routing channels and exit fittings required to be covered by the clamp, the width of the first body portion and the second body portion may be different from that illustrated in FIGS. 4A, 4C and 4D in other examples. In this example the clamp has a width of about 38 mm (shown as element 41 in FIG. 4D), a height of about 6 mm (shown as element 43 in FIG. 4B) and a length (shown as element 45 in FIG. 4B) of about 20 mm. Other examples may have other dimensions.

Extending from each of the first and second body portions 40, 42 is a generally hook-shaped section ending in a flanges, lips or protrusions 44, 46 for engaging recesses 22 formed on opposite sides of the base 24 of the routing fixture. Thus, the overall form of the clamp is generally "C" shaped, with a bulge for receiving the exit fitting, as can be seen most clearly in FIG. 4C.

In use, the protrusions 44, 46 of the clamp engage the recesses 22 of the base 24 of the routing fixture. The first body portion 40 engages the routing channels which do not have an exit fitting and the second body portion 42 engages the exit fitting.

The routing fixture, exit fitting and clamp may be formed of thermoplastic or reinforced elastomeric materials. Such materials have sufficient flexibility to enable the assembled system to be flexible along with any movement in the underlying structure to which it is attached. Specific materials that may be used include polyamides (such as Nylons, for example Nylon 66), polyphenylene sulphide (PPS), and polyether ether ketone (PEEK). The routing fixture, exit fitting and clamp may be formed from the same or different materials.

Manufacture of the routing fixture, exit fitting and clamp can be achieved by any suitable method, including extrusion, moulding and additive manufacturing techniques. The routing fixture, which has a relatively constant cross section, can be manufactured by extrusion followed by subsequent finishing, for example to form any recesses. Extrusion of the routing fixture may be advantageous to allow long lengths as required by the application. The exit fitting and clamp, which are generally shorter in axial length may be more suitable for manufacture by moulding, such as injection moulding.

Figure 5A:
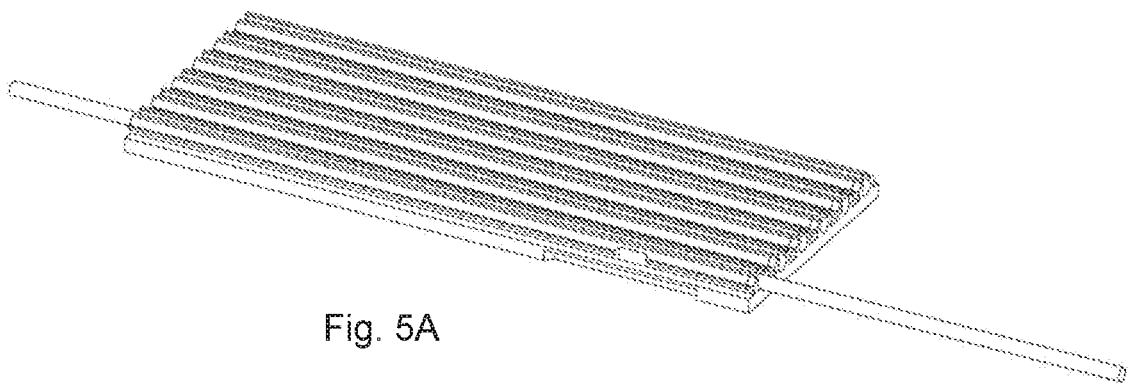
FIGS. 5A to 5E depict a schematic three-dimensional view of the stages of assembly of the cable routing system of FIG. 1.
Figure 5B:
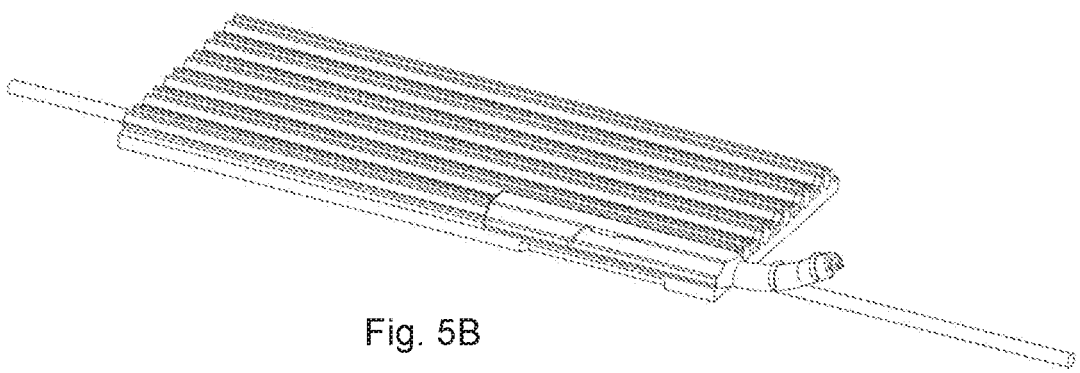
Figure 5C:
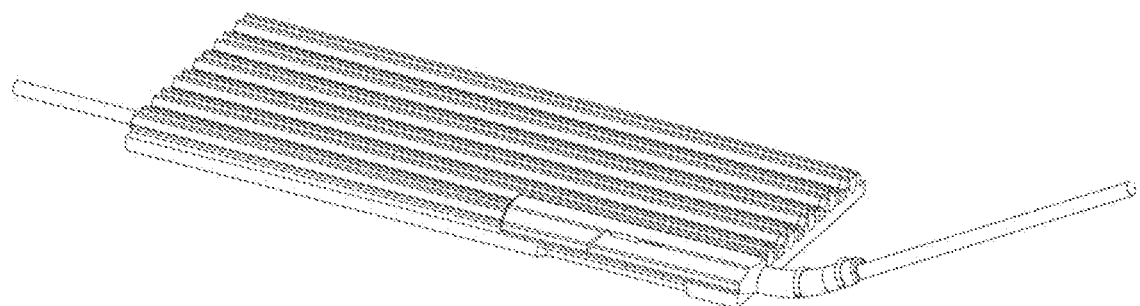

Assembly of the system will now be described with reference to FIGS. 5A to 5E, which show the stages of the assembly and FIG. 6 which is a flow chart of the method 150 of installing cables. For clarity, installation of a single cable in one routing channel is described.

First, the routing fixture is provided on a structural element at block 152. For example the routing fixture may be attached to a structural element in any suitable way, such as by bonding, mechanical fastening, welding and so on. The routing fixture may also be integrally formed with the structural element in some examples.

Next, at block 154, a cable is installed into the routing channel, for example by press-fitting. The resulting assembly at this stage is depicted by FIG. 5A. The dimensions of the routing channel and cable are such that a clearance is maintained once the cable is received in the routing channel. The width of the opening is narrower than the cable, so it is retained, but there is sufficient clearance to allow for any thermal expansion (radial or longitudinal) of the cable within the routing channel.

At block 156, the exit fitting is engaged with the channel by sliding it over an end of the channel, so that the protrusion of the exit fitting engages the flange formed on the routing channel. When the exit fitting reaches the correct longitudinal position it engages with the recess to restrict further axial movement. This position can be seen in FIG. 5B, where the cable is completely enclosed over the portion of the routing channel engaged by the exit fitting. Although slide fitting has been described, other methods of engagement may also be used in other examples, for example a snap fit or a mechanical connection.

At block 158, the cable is bent away from the axis of the routing channel and away from the plane or the base of the routing fixture, so that it is retained in the exit channel by a press-fit. The resulting assembly at this stage is depicted in FIG. 5C. In other examples, the exit channel can extend in a different direction, for example away from the routing channel but still within a plane of the base.

Figure 5D:
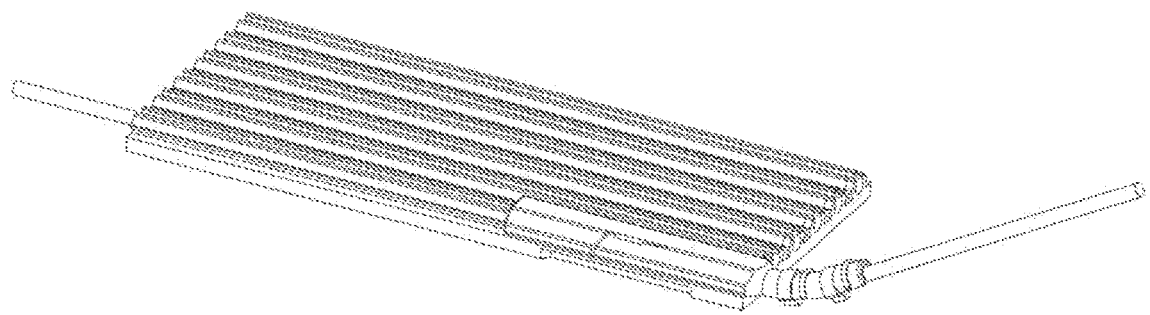
Figure 6:
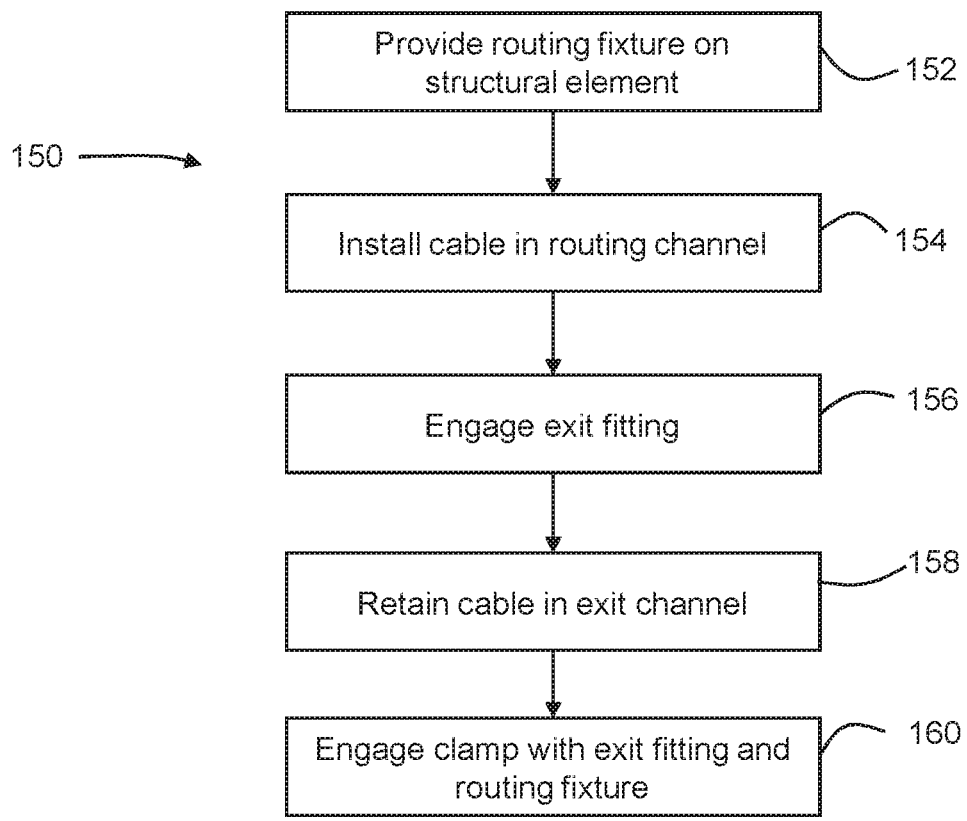
FIG. 6 is a schematic diagram of a method of routing cables according to an embodiment.

To further secure the cable within the exit channel, a retaining element, such as a cable tie is installed around the exit channel and the cable, as can be seen in FIG. 5D. This additional retaining element may be omitted in some examples, or may be the sole way of retaining the cable within the channel.

Figure 5E:
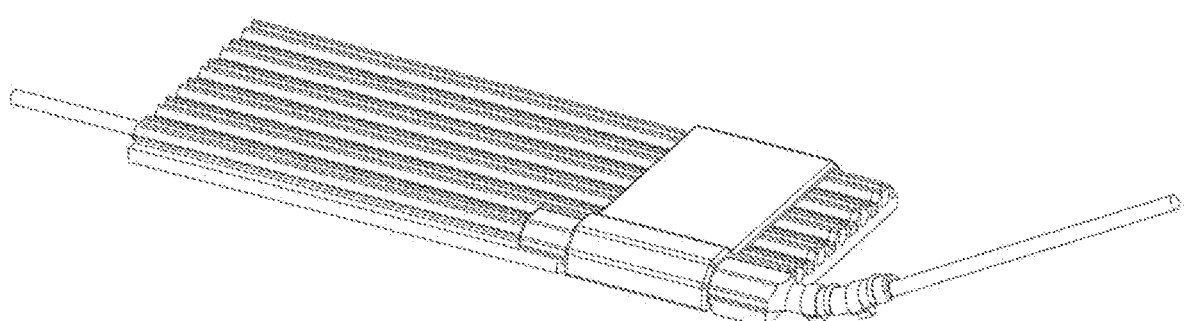

Finally, at block 160 the clamp is placed over the routing fixture and the exit fitting and engaged with them, resulting in the final assembly depicted in FIG. 5E.

The method 150 may be carried out before or after the structural element is built into the overall structure. For example, cables may be preinstalled on a structural element, such as stringer of a wing, before the stringer is built into the wing. In that case, the clamp operates to hold the cables in place during and after assembly.

Figure 7:
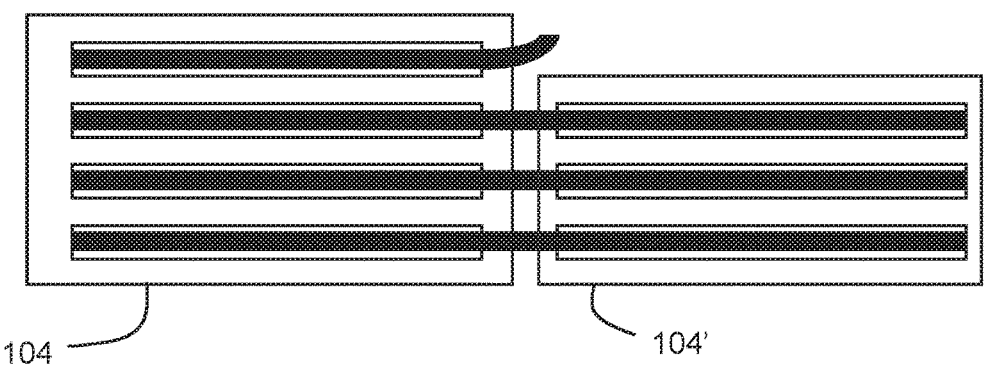
FIG. 7 is a schematic diagram showing a change in a number of cable channels in an embodiment.

FIG. 7 is a schematic diagram of how cables may exit, or break out, of the routing structure on long cable runs. Some cables may be required to travel further then others. For example, in an aircraft some hardware requiring a cable connection may be located further away with others located closer. Considering an aircraft wing, the number of cables required decreases with distance from the fuselage. FIG. 7 depicts a routing fixture 104 with four cables, with one exiting and three cables continuing. The exit fitting is not shown for clarity. An adjacent routing fixture 104' exit has three channels and thus has a lower profile within the structure. In this way the profile and volume required for cabling decreases as the number of cables for routing decreases. In general, a routing fixture may have an adjacent routing fixture with fewer routing channels so that the routing fixture only has as large a profile as is needed for the cables it is required to hold or route.

While FIG. 7 depicts the two routing fixtures 104, 104' having coaxial, or aligned, routing channels, other examples need not be so aligned, for example the cable may be flexible enough to bridge the gap between adjacent routing fixtures which are not aligned.

Figure 8:
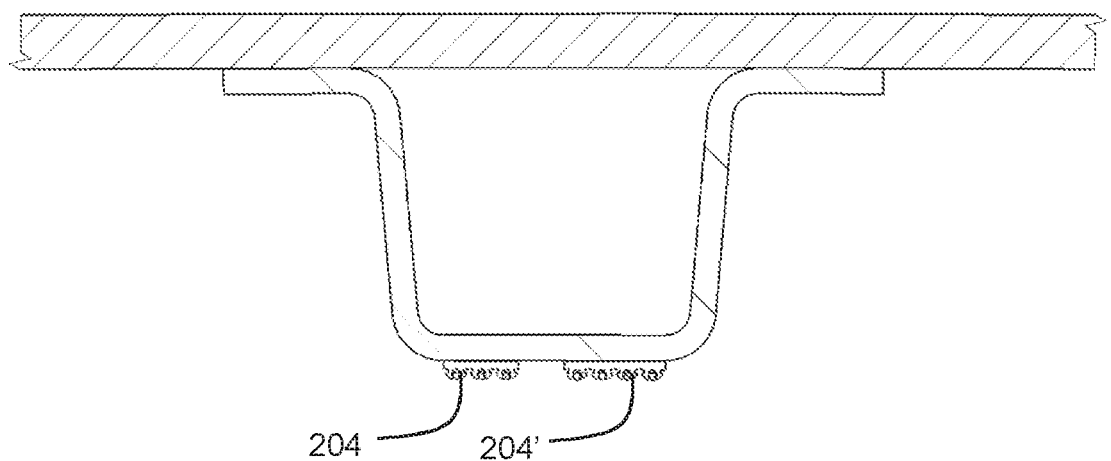
FIG. 8 is a schematic cross section of routing fixtures of an embodiment provided on a structural element.

FIG. 8 depicts and example of two routing fixtures 204, 204' in place on a structural element, such as a stringer of an aircraft wing. This shows how more than one routing fixture can be used to provide the required cable route and that these routing fixtures can define different numbers of routing channels.

Figure 9:
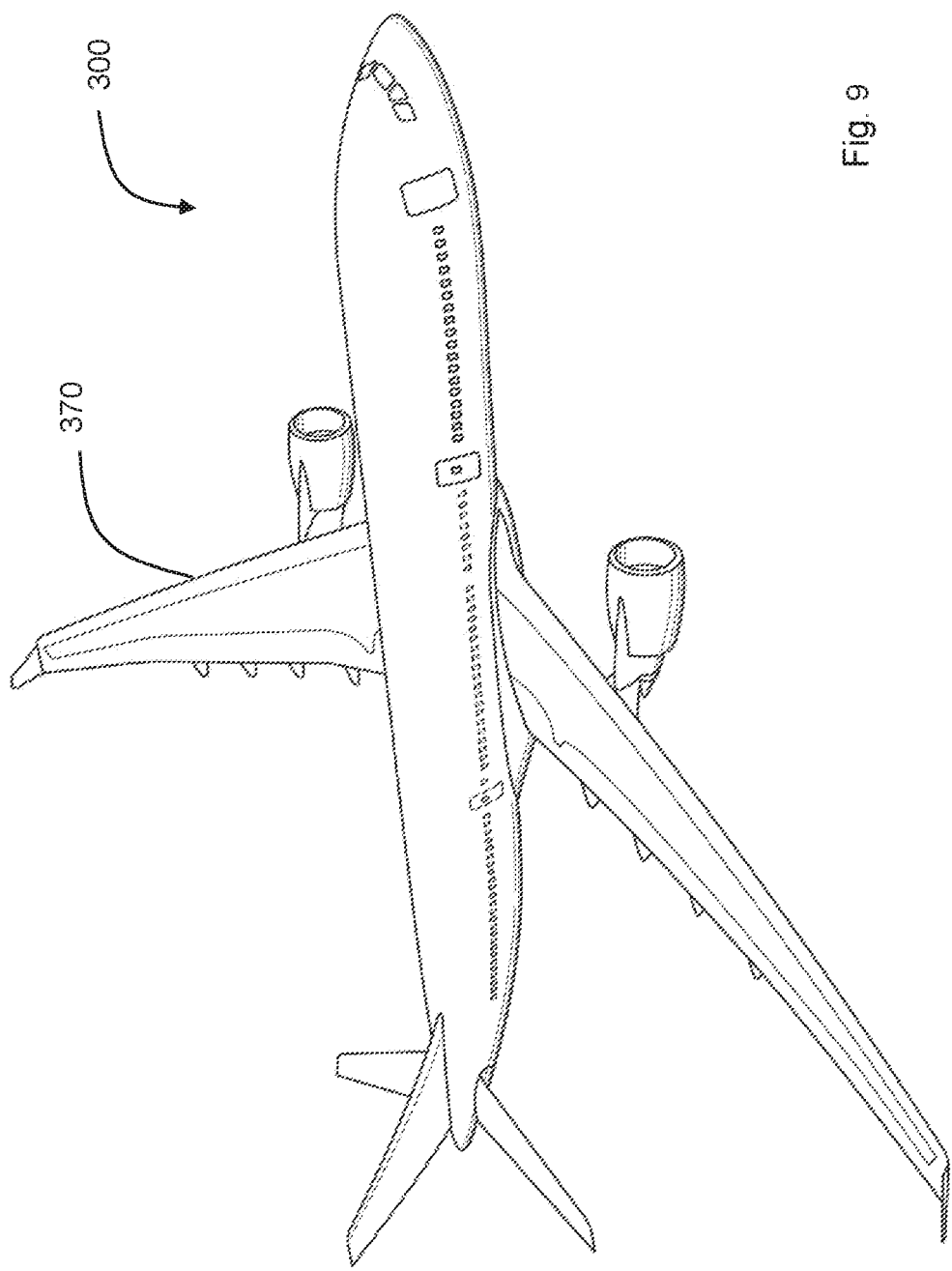
FIG. 9 is a schematic three-dimensional view of an aircraft which can include the cable routing system.

FIG. 9 depicts an aircraft 300 which may use the cable routing system. For example, the cable routing system may be used inside an aircraft wing 370. The low profile minimises the space taken up within a space constrained environment, such as an aircraft wing 370.

Although the cable routing system can be used with any type of cable, when used with an optical cable, or other electrically safe cable, it can allow cables to be routed inside or through an aircraft fuel tank. This can allow sensors inside the fuel tank, such as fuel level, pressure and temperature sensors which communicate using optical signals to be connected easily to a cable. Routing cables through elements such as a fuel tank may free space elsewhere, enabling the overall profile of the wing to be reduced.

Another benefit of the cable routing system described herein is that it allows cables to be exited or broken out of a cable route without any requirement to cut the cable. This can be beneficial for optical cables and hydraulic cables or lines. The exit channel allows the radius of any bend on exit to be controlled as required, ensuring that any requirement of minimum radius of curvature of the cable is not exceeded.

The combination of exit fitting and clamp provides a secure retention, but cables can be easily identified or removed for maintenance if required.

The routing of the cables in a row, parallel to each other, provides a low profile and enables a single cable to be easily removed for maintenance, without impacting on other cables installed in the routing fixture. This can also allow cables to conform the structure that the routing fixture is applied to.

It is to be noted that the term "or" as used herein is to be interpreted to mean "and/or", unless expressly stated otherwise.

The above embodiments are to be understood as illustrative examples of the invention. Further embodiments of the invention are envisaged. For example, the exit fitting may be fitted on a routing channel other than the outermost one, other routing channels than the outermost one may be provided with a recess for engaging the exit fitting and retaining the exit fitting at a particular axial position, or more than one exit fitting may be installed at the same longitudinal position to allow more than on cable to exit at one time. Also, exit fittings may be provided which define exit channels for two or more directly adjacent cables in the routing fixture. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

The invention claimed is:

1. An aircraft cable routing system comprising:
   a routing fixture comprising a routing channel for a cable, wherein the routing channel defines an opening along its length, and wherein a width dimension of the opening is smaller than an internal width dimension of the routing channel;
   wherein the routing channel includes a first flange and a first recess;
   an exit fitting defining an exit channel, wherein the exit fitting is configured for engagement with the routing channel such that the exit channel is directed away from the routing channel;
   wherein the exit fitting comprises a first protrusion removably engaging the first flange for resisting movement of the exit fitting relative to the routing channel in a first direction, and a second protrusion removably engaging the first recess for resisting movement of the exit fitting relative to the routing channel in a second direction substantially perpendicular to the first direction;
   at least one ridge on an outer surface of the exit fitting, and a retainer configured to engage the at least one ridge to retain a cable in the exit channel in use; and,
   further comprising a clamp including protrusions which engage second recesses on the routing channel to secure the clamp over the exit fitting and the routing channel.

2. An aircraft cable routing system according to claim 1, wherein the routing fixture comprises a base for supporting the channel, and the exit channel is directed away from the base in use.

3. An aircraft cable routing system according to claim 1, wherein the exit channel defines an opening along its length which is positioned facing the opening defined by the routing channel when the exit fitting is engaged with the routing channel.

4. An aircraft cable routing system according to claim 1, wherein the retainer is configured to anchor a cable in a longitudinal direction relative to the exit channel.

5. An aircraft cable routing system according to claim 1, wherein the routing fixture defines at least two routing channels, wherein the at least two routing channels are arranged in a row and generally parallel to each other.

6. An aircraft cable routing system according to claim 5, comprising a second routing fixture which defines fewer channels than the routing fixture.

7. An aircraft wing comprising:
   an aircraft cable routing system according to claim 1; and
   a cable installed in the routing channel and the exit channel.

8. An aircraft wing according to claim 7, wherein the cable routing system is positioned inside a fuel tank.

9. An aircraft comprising:
   a cable routing system according to claim 1; and
   a cable installed in the routing channel and the exit channel.

10. A method of installing cables in an aircraft comprising:
    providing a routing fixture defining a routing channel on a structural element of the aircraft;
    installing a cable in the routing channel;
    engaging an exit fitting with the routing channel, the exit fitting defining an exit channel directed away from the routing channel;
    wherein the routing channel includes a first flange and a first recess;
    wherein the exit fitting comprises a first protrusion removably engaging the first flange for resisting movement of the exit fitting relative to the routing channel in a first direction, and a second protrusion removably engaging the first recess for resisting movement of the exit fitting relative to the routing channel in a second direction substantially perpendicular to the first direction;
    at least one ridge on an outer surface of the exit fitting, and a retainer configured to engage the at least one ridge for retaining the cable in the exit channel; and,
    further comprising a clamp including protrusions which engage second recesses on the routing channel to secure the clamp over the exit fitting and the routing channel.

11. A method according to claim 10, wherein the engaging an exit fitting comprises sliding the exit fitting over an end of the routing channel.

12. A method according to claim 10, wherein the routing fixture defines at least two routing channels, and the method further comprises:
    providing a second routing fixture on a structural element, wherein the second routing fixture is positioned adjacent the routing fixture and defines fewer routing channels than the routing fixture;
    installing a second cable in both a second routing channel of the routing fixture and a routing channel of the second routing fixture.

13. A cable routing system for an aircraft comprising:
    a cable channel which is substantially a tubular segment, wherein the cable channel is open along its length and an opening to the cable channel is narrower than an internal diameter of the cable channel;
    wherein the cable channel includes a first flange and a first recess;
    an exit fitting defining an exit channel, wherein the exit fitting is configured for engagement with the cable channel such that the exit channel is aligned with the cable channel at one end and directed away from a longitudinal axis of the cable channel;
    wherein the exit fitting comprises a first protrusion removably engaging the first flange for resisting movement of the exit fitting relative to the routing channel in a first direction, and a second protrusion removably engaging the first recess for resisting movement of the exit fitting relative to the routing channel in a second direction substantially perpendicular to the first direction;
    at least one ridge on an outer surface of the exit fitting, and a retainer configured to engage the at least one ridge to retain a cable in the exit channel in use; and, further comprising a clamp including protrusions which engage second recesses on the routing channel to secure the clamp over the exit fitting and the routing channel.

* * * * *